United States Patent
Zhu et al.

(10) Patent No.: US 7,958,064 B2
(45) Date of Patent: Jun. 7, 2011

(54) ACTIVE FEATURE PROBING USING DATA AUGMENTATION

(75) Inventors: Shenghuo Zhu, Santa Clara, CA (US);
Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 909 days.

(21) Appl. No.: 11/869,892

(22) Filed: Oct. 10, 2007

(65) Prior Publication Data

US 2008/0147852 A1  Jun. 19, 2008

Related U.S. Application Data

(60) Provisional application No. 60/869,799, filed on Dec. 13, 2006.

(51) Int. Cl.
*G06F 15/18* (2006.01)
(52) U.S. Cl. .......................... 706/12; 706/45
(58) Field of Classification Search ............ 706/12, 706/45
See application file for complete search history.

(56) References Cited

U.S. PATENT DOCUMENTS

| | | | |
|---|---|---|---|
| 6,058,205 A | 5/2000 | Bahl | |
| 6,557,011 B1 | 4/2003 | Sevitsky | |
| 7,087,018 B2 * | 8/2006 | Comaniciu et al. | 600/300 |
| 7,458,936 B2 * | 12/2008 | Zhou et al. | 600/437 |
| 7,738,705 B2 * | 6/2010 | Casadei | 382/181 |
| 2004/0133083 A1 * | 7/2004 | Comaniciu et al. | 600/301 |
| 2004/0193036 A1 * | 9/2004 | Zhou et al. | 600/407 |

OTHER PUBLICATIONS

Zhu et al ("Dynamic Active Probing of Helpdesk Databases" VLDB'08, Aug. 24-30).*
Zhou et al ("Conditional Feature Sensitivity: A Unifying View on Active Recognition and Feature Selection" ICCV'03) Date Unknown.*
Mirzadeh et al ("Feature Selection Methods for Conversational Recommender Systems" EEE'05 Mar. 29-Apr. 1).*
Yang et al ("Enhancing the Effectiveness of Interactive Case-Based Reasoning with Clustering and Decision Forests" Applied Intelligence, 2001).*
Wang et al ("iHelp: An Intelligent Online Helpdesk System" IEEE 2010).*
Ackley, D. R., Hinton, G. E., & Sejnowski, T. J. (1985). A learning algorithm for Boltzmann machines. Cognitive Science, 9, 147-169.
Cohn et al, Active Learning with Statistical Models, J. Artificial Intelligence Res. 4 (1996), 129-145.
Dempster, A. P., Laird, N. M., & Rubin, D. B. (1976). Maximum likelihood from incomplete data via the EM algorithm. Proceedings of the Royal Statistical Society, 1-38.
A. Efros, A. A., & Leung, T. K. (1999). Texture synthesis by non-parametric sampling. *IEEE International Conference on Computer Vision* (pp. 1033-1038). Corfu, Greece.
Franz et al, Unsupervised and Supervised Clustering for Topic Tracking, NAACL-2001.

(Continued)

*Primary Examiner* — Michael Holmes
*Assistant Examiner* — Lut Wong
(74) *Attorney, Agent, or Firm* — Bao Tran; Joseph Kolodka (57) ABSTRACT

Systems and methods are disclosed that performs active feature probing using data augmentation. Active feature probing is a means of actively gathering information when the existing information is inadequate for decision making. The data augmentation technique generates factitious data which complete the existing information. Using the factitious data, the system is able to estimate the reliability of classification, and determine the most informative feature to probe, then gathers the additional information. The features are sequentially probed until the system has adequate information to make the decision.

22 Claims, 4 Drawing Sheets

OTHER PUBLICATIONS

Ghahramani, Z., & Jordan, M. L (1994). Supervised learning from incomplete data via anEM approach. *Advances in Neural Information Processing Systems* (pp. 120127). MorganKaufmann Publishers. Inc.

Heckerman, A tutorial on learning Bayesian networks, Technical Report MSR-TR-9506 (Mar. 1995).

Seung et al, Query by Committee, date unknown.

Xu et al., Query Expansion Using Local and Global Document Analysis, date unknown.

Kumaran et al., Simple Questions to Improve Pseudo-Relevance Feedback Results, SIGIR'06, Aug. 6-10, 2006, Seattle, WA.

* cited by examiner

ACTIVE FEATURE PROBING USING DATA AUGMENTATION

This application claims the benefit of U.S. Provisional Application 60/869,799 filed Dec. 13, 2006, the content of which is hereby incorporated-by-reference.

BACKGROUND

In tasks that classify instances with few known features, it is usually difficult to build useful classifiers without adequate information because the results are inaccurate or unreliable. To improve the accuracy, the classifier needs to gather more information before classification. As an example, in a technical support center, a customer calls the technical support center with a technical issue. At the beginning, the customer (the information source) may only provide limited information (feature values) to a representative at the center. To identify the issue (classification), the representative asks questions (unknown features), and the customer provides some answers (values of probed features) or maybe volunteers some additional information (values of non-probed features). After a few rounds, the representative may identify (classify) the problem correctly and provide a suitable solution. In such tasks, additional to the accuracy of identifying the problem, the efficiency or the number of probing is also an importance criterion to evaluate the performance.

A pre-built decision tree may be considered as a straightforward approach to such a task. At each non-leaf node, the tree classifier probes the feature values. With the supplied feature value, the classifier follows the branch. Repeating the process, the classifier reaches a leaf node and makes the prediction with adequate information. However, ignoring the given feature values at the beginning and the volunteered feature values during the process makes this approach inefficient. Moreover, the data source may not be able to provide all feature values for some instances, which requires the tree to have an "unknown" branch for each split. Instead of using static pre-built decision trees, the system dynamically creates a split based on the given information.

To dynamically probe feature values, the system needs to estimate which features are the most informative to make the decision. To estimate the information given by an unknown feature, the system needs to classify the instance given the known feature values and the unknown feature under estimation. On one hand, building classifiers for all possible feature subsets is impractical, because the number of possible combinations of features is exponentially large when the number of features is large. On the other hand, building classifiers on-the-fly is also impractical because of the cost of building classifiers.

SUMMARY

Systems and methods are disclosed that performs active feature probing using data augmentation. Active feature probing actively gathers information when the existing information is inadequate for decision making. The data augmentation technique generates factitious data which complete the existing information. Using the factitious data, the system is able to estimate the reliability of classification, and determine the most informative feature to probe, then gathers the additional information. The features are sequentially probed until the system has adequate information to make the decision.

In one aspect, a method to classify information includes augmenting existing information with factitious data; performing actively feature probing using the factitious data; generate a model based on the active feature probing with factitious data; and classifying information using the model.

Implementations of the system can include one or more of the following. The system learns existing information. One or more feature vectors can be generated by clustering data from the existing information and the factitious data. A classification model can be generated using the one or more feature vectors. Information can be learned by clustering data from the existing information and the factitious data to generate one or more feature vectors and by generating a classification model from the one or more feature vectors. The classifying information can be done at run-time. The system can evaluate information in a new case to be classified. The evaluating information can include determining entropy of a set of factitious cases generated from the new case. The system can gather additional information for the new case. The system can identify the most similar past case as a solution. The system can evaluate confidence on one or more outcomes after several probing. The system can measure entropy for the one or more outcomes with $$H(y \mid x_{obs}) = -\sum_{y \in \mathcal{Y}} Pr(y \mid x_{obs}) \log Pr(y \mid x_{obs}).$$

The system can determine a feature to probe. The feature can be selected to minimize an expected loss. The system can determine a goal for a given $x_{obs}$ as:

$$\operatorname*{argmin}_{i \in un} E_{Pr(x_i \mid x_{obs})} \mathcal{L}(Pr(y \mid x_{obs+i})),$$

where $\mathcal{L}(\mathcal{Q}(\mathcal{Y}))$ is a loss function of a distribution $\mathcal{Q}(\mathcal{Y})$ on $\mathcal{Y}$ and $Pr(\mathcal{Y} \mid x_{obs+i}) = E_{Pr(x_{un} \setminus i \mid x_{obs+i})} Pr(\mathcal{Y} \mid x)$, obs+$i$=obs $\cup \{i\}$, and un\$i$=$\{j \in un \mid j \neq i\}$.

The system can evaluate a probability by marginalizing a full probability $$Pr(x_i, y \mid x_{obs}) = \sum_{x_{un \setminus i} \in \mathcal{X}_{un \setminus i}} Pr(x_i, y, x_{un \setminus i} \mid x_{obs})$$

$$= \sum_{x_{un \setminus i} \in \mathcal{X}_{un \setminus i}} Pr(y \mid x_{obs}, x_{un \setminus i}, x_i)$$

$$Pr(x_{un \setminus i}, x_i \mid x_{obs})$$

$$= \sum_{x_{un \setminus i} \in \mathcal{X}_{un \setminus i}} Pr(y \mid x) Pr(x_{un} \mid x_{obs}).$$

The system can obtain the distribution of class label given all features, $Pr(\mathcal{Y} \mid x)$, by a classification method. This can be done by sampling a number of augmented instances using a Monte Carlo method to approximate $Pr(x_i, \mathcal{Y} \mid x_{obs})$ without explicitly summing over all possible un\$i$. The system can sample instances by drawing virtual instances. Samples can be obtained from a distribution using a Gibbs sampling method or from a distribution using a kernel density estimation. The system can dynamically building a decision split based on sampled data from $$Pr(x_{un} \mid x_{obs}) = Pr(x_{un}, x_{obs}) / Pr(x_{obs}) \times \frac{1}{Pr(x_{obs})}$$

-continued $$\sum_{X \in \mathcal{D}} K(x, X) \times \sum_{X \in \mathcal{D}} K_{obs}(x_{obs}, X_{obs}) \prod_{i \in un} K_i(x_i, X_i).$$

Advantages of the system may include one or more of the following. The system needs to build only one classifier, and classifies a new data point by classifying its augmented factitious data. The sampling method using the kernel density model is highly efficient and provides interactive operation to quickly serve the user or support staff. The system efficiently uses existing information while providing high accuracy.

DESCRIPTION

Figure 1:
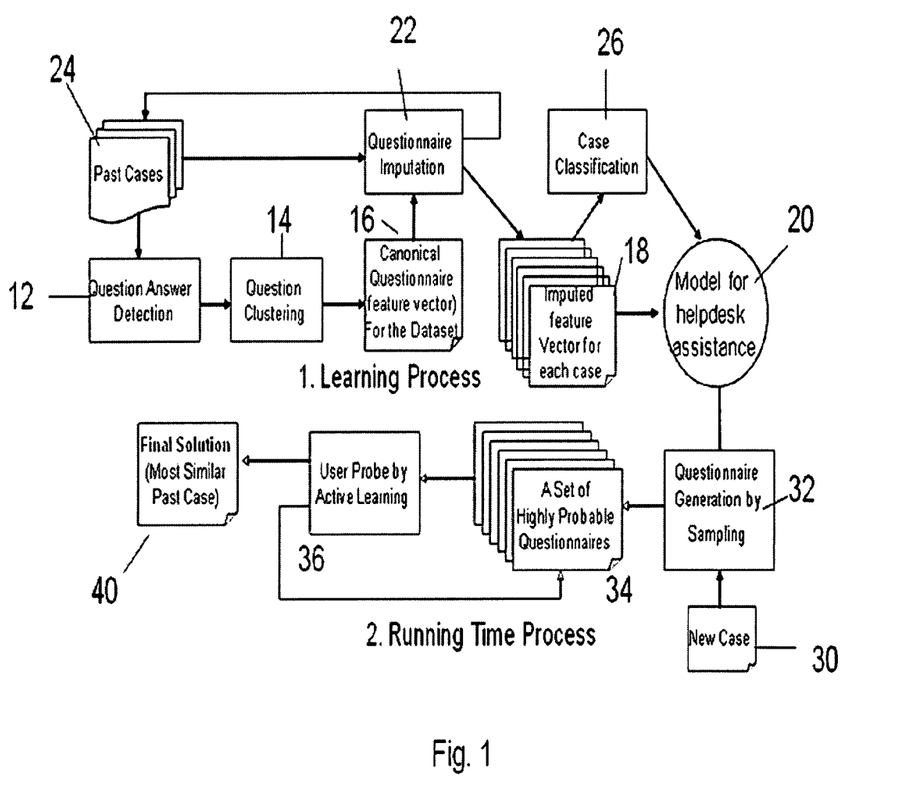
FIG. 1 shows an exemplary system to perform active feature probing using data augmentation.

FIG. 1 shows an exemplary system to perform active feature probing using data augmentation. Active feature probing is a means of actively gathering information when the existing information is inadequate for decision making. The data augmentation technique generates factitious data which complete the existing information. Using the factitious data, the system is able to estimate the reliability of classification, and determine the most informative feature to probe, then gathers the additional information. The features are sequentially probed until the system has adequate information to make the decision.

Turning now to FIG. 1, the system includes a learning process 1 and a run-time process 2. In the learning process 1, the process receives a data set with questions and answers to those questions (12). Next, clustering is performed on the question data set (14). A feature vector (canonical questionnaire) is determined for the data set (16). The learning process can repeatedly perform questionnaire imputation (22) on past cases (24). From the past cases, the process can detect questions and answers (12). From the questionnaire imputation, the learning process can also impute the feature vector for each case (18). Next, the learning process 1 can generate a model for help-desk assistance (20). Alternatively, the learning process 1 can classify cases (26) and then generate the model for help-desk assistance (20).

Once the model has been built, the run time process 2 can operate using the model. A new case can be submitted (30). The system can perform questionnaire generation by sampling the questionaires (32). Next, a set of highly probably questionnaires are identified (34), and the user can probe by active learning (36). The most similar past case is selected as the final solution (40).

The system augments an instance to multiple factitious instances (multiple imputation). The goal of data augmentation is to set each unknown feature to a value according to the data model. Instead of setting the features to the most likely values, multiple imputation sets the features to values drawing from the distribution of the data. The system assumes the classifier and the data model can be learned from the existing training data. Once the system can estimate the information given by each unknown feature, the system is able to choose the most informative one to probe its actual value. The system can repeat the process until the system knows sufficient information about the instance. Then, the system can predict the target of the instance.

Figure 2:
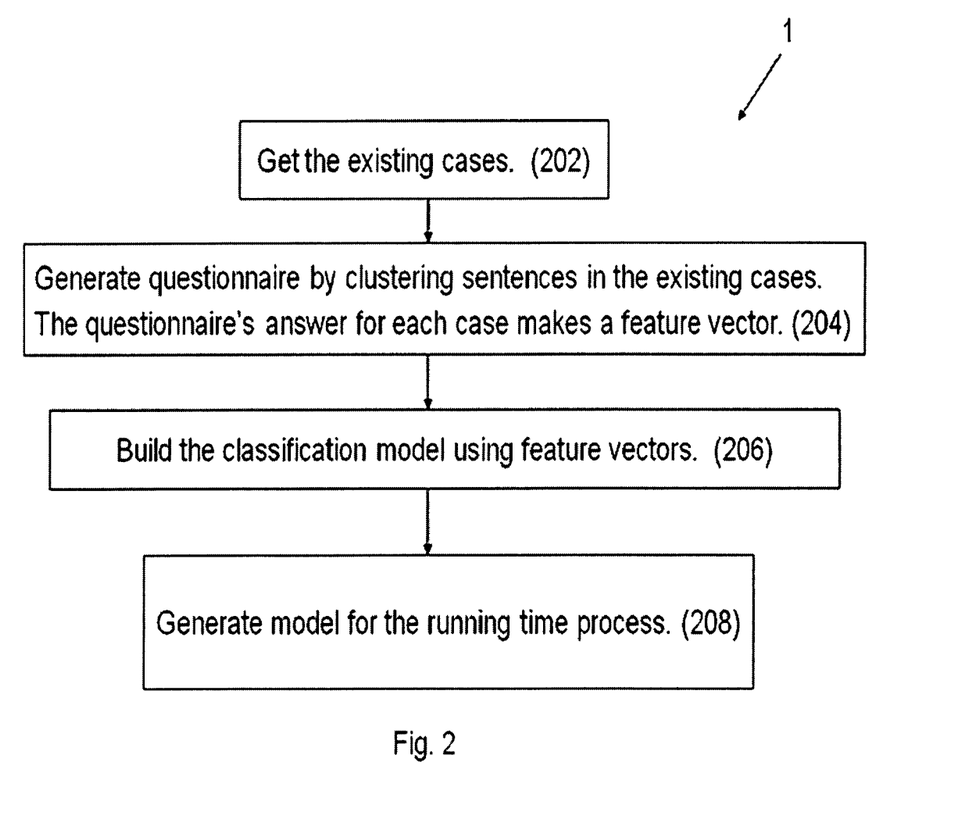
FIG. 2 shows an exemplary learning process.

Turning now to FIG. 2, the learning process 1 is detailed. First, existing cases are retrieved (202). Next, the process generates questionnaire(s) by clustering sentences in existing cases and generates a feature vector for each corresponding answer to each questionnaire (204). The process 1 then builds a classification model using the feature vectors (206). Next, a model is generated for the run-time process 2.

Figure 3:
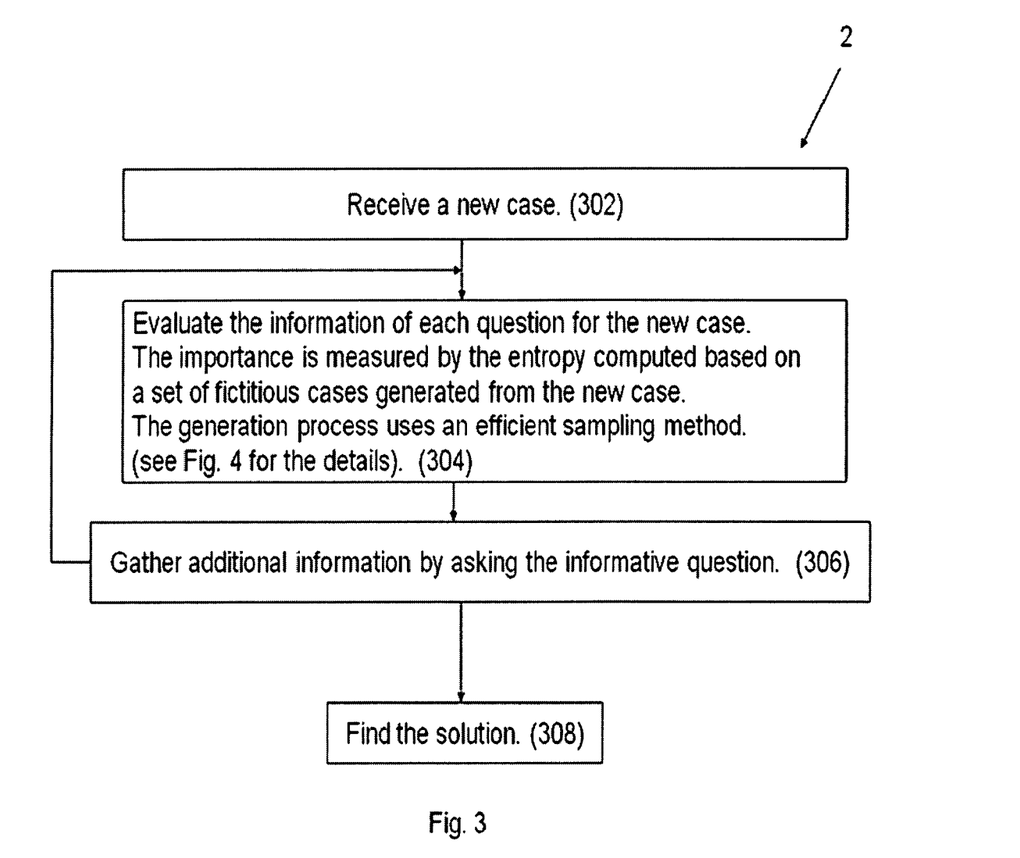
FIG. 3 shows an exemplary run time process.

FIG. 3 shows the run time process 2 in more detail. First, the process 2 receives a new case (302). The process evaluates information of each question for the new case (304). The importance is measured by the entropy computed based on a set of fictitious cases generated from the new case. The generation process uses an efficient sampling method shown in more details in FIG. 4. The process then gathers additional information by asking one or more informative questions (306). A solution is then determined (308).

Figure 4:
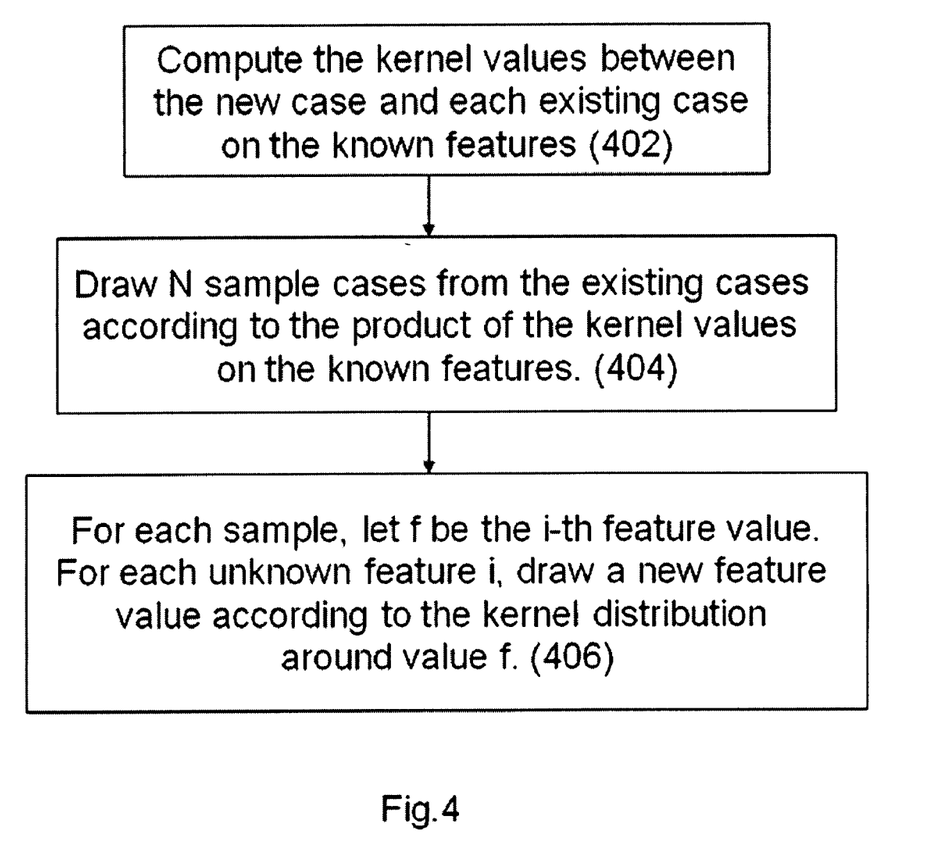
FIG. 4 shows an exemplary sampling method.

FIG. 4 shows one embodiment of an efficient sampling method. The process computes kernel values between the new case and each existing case based on the known features (402). Next, the process draws N sample cases from existing cases according to the product of the kernel values of the known features (404). For each sample, the process sets f as the i-th feature value and for each unknown feature i, the process draws a new feature value according to the kernel distribution around the value f (406).

In the following discussion on active feature probing, let $\mathcal{Y}$ be the set of classes, $\mathcal{F}$ be the set of features denoted by their indexes, $\{1, \ldots, d\}$, and $\mathcal{X} = \mathcal{X}_1 \times \ldots \times \mathcal{X}_d$ be the d-dimensional feature space. In the feature space, the system uses NA as a possible choice, which represents unknown feature value. For simplicity, in one embodiment, the system assumed all feature variables are categorical. For a given variable $x = (x_1, \ldots, x_d) \in \mathcal{X}$, let obs be the set of indexes whose corresponding feature values are currently known, un be the set of the remainder indexes. The system denote the x's components with indexes in a set, s, by $x_s$, for example, $x_{obs}$ the known part of x, and $x_{un}$ the unknown part of x. In active feature probing, the system looks for a policy $\pi: x \to \mathcal{F} \cup \mathcal{Y}$. For a given instance, x, to be classify, $\pi$ maps X to a feature in $\mathcal{F}$ to probe its value, or to a class in z,111 to be its label. The criterion of an optimal probing policy need make tradeoff between classification accuracy and the average number of features probed before classification. Given a criterion, the optimization may involve a Bellman equation, which can be solved by reinforcement learning.

In one illustrative empirical feature probing method, the system avoids the complicated reinforcement learning framework. In this embodiment, the system defines a policy in a greedy way. The idea of the greedy approach is to find the most informative features to probe, which is similar to find the best splits for building decision trees, until certain stop criteria meet. For stop criteria, the system considers two cases. On one hand, when the system has sufficient confidence of the outcomes after several probings, further probings may increase little accuracy at a large cost of performing the probings. The system may consider stopping further probings. To measure the confidence, the system can empirically use the entropy of the outcomes, i.e.

$$H(y \mid x_{obs}) = -\sum_{y \in \mathcal{Y}} Pr(y \mid x_{obs}) \log Pr(y \mid x_{obs}).$$

On the other hand, when the system is not confident with the outcomes at all after many probings, even further probings may not increase the accuracy. The system may consider stopping the probing to save the cost of probing.

Now the system looks for a feature to probe. Let $\mathcal{L}(\mathcal{Q}(\mathcal{Y}))$ be the loss function of a distribution $\mathcal{Q}(\mathcal{Y})$ on $\mathcal{Y}$. Active feature probing finds a feature to minimize the expected loss. Given $x_{obs}$, the goal is written as $$\operatorname*{argmin}_{i \in un} E_{Pr(x_i \mid x_{obs})} \mathcal{L}(Pr(y \mid x_{obs+i})),$$

where $Pr(\mathcal{Y} \mid x_{obs+i}) = E_{Pr(x_{un} \setminus i \mid x_{obs+i})} Pr(\mathcal{Y} \mid x)$, $obs+i=obs \cup \{i\}$, and $un \setminus i = \{j \in un \mid j \neq \omega\}$.

When the system uses log loss, i.e.,
$$\mathcal{L}(\mathcal{Q}(\mathcal{Y})) = E_{Q(y)} \log Q(\mathcal{Y}),$$

the goal is actually to find the feature with the maximum information gain to probe. Maximum information gain is one of many criteria to find a best split during building a decision tree. The information gain, i.e. conditional mutual information between a variable Xi and y given $x_{obs}$, is defined as $$I(x_i, y \mid x_{obs}) = H(y \mid x_{obs}) + \sum_{\substack{x_i \in X_i \\ y \in \mathcal{Y}}} Pr(x_i, y \mid x_{obs}) \log Pr(y \mid x_{obs}, x_i).$$

Because $$Pr(y \mid x_{obs}, x_i) = \frac{Pr(x_i, y \mid x_{obs})}{\sum_{y \in y} Pr(x_i, y \mid x_{obs})},$$

$$Pr(y \mid x_{obs}) = \sum_{x_i \in x_i} Pr(x_i, y \mid x_{obs}),$$

the system only needs to estimate $Pr(x_i, y \mid x_{obs})$ to evaluate each $I(x_i, y \mid x_{obs})$. To avoid to use a large number of models to estimate $Pr(x_i, y \mid x_{obs})$ with all combinations of obs and i, the system evaluates the probability by marginalizing the full probability, $$Pr(x_i, y \mid x_{obs}) = \sum_{x_{un} \setminus i \in X_{un} \setminus i} Pr(x_i, y, x_{un \setminus i} \mid x_{obs})$$

$$= \sum_{x_{un} \setminus i \in X_{un} \setminus i} Pr(y \mid x_{obs}, x_{un \setminus i}, x_i) Pr(x_{un \setminus i}, x_i \mid x_{obs})$$

$$= \sum_{x_{un} \setminus i \in X_{un} \setminus i} Pr(y \mid x) Pr(x_{un} \mid x_{obs}).$$

It is easy to model and obtain the distribution of class label given all features, $Pr(\mathcal{Y} \mid x)$, by various classification methods. Given $x_{obs}$, if the system can sample a sufficient number of augmented instances $x=(x_{obs}, x_{un})$'s, using Monte Carlo methods, the system can approximate all $Pr(x_i, \mathcal{Y} \mid x_{obs})$ without explicitly sum over all possible $un \setminus i$.

Various Monte Carlo methods can be used for data models, as discussed in more details below. Suppose that the system has a sample set of augmented instances, denoted $\mathcal{S} = \{x^{(j)}\}$, where $x_{obs}^{(j)} = x_{obs}$ for all j's, there is a weight, $w_j$, associated to each sample, $x^{(j)}$. The value of $w_1$ depends on sampling methods. Without obvious notation, $w_j = 1/|\mathcal{S}|$. The system can define population mutual information as mutual information as $$\tilde{I}(x_i, y; \mathcal{S}) = \sum_{x_i, y} \tilde{p}(x_i, y; \mathcal{S}) \log \tilde{p}(x_i, y; \mathcal{S}) -$$
$$\sum_{x_i} \tilde{p}(x_i; \mathcal{S}) \log \tilde{p}(x_i; \mathcal{S}) - \sum_{y} \tilde{p}(y; \mathcal{S}) \log \tilde{p}(y; \mathcal{S})$$

where $$\tilde{p}(x_i, y; \mathcal{S}) = \sum_{x^{(j)} \in s} \tilde{p}(x^{(j)}; \mathcal{S}) Pr(y \mid x^{(j)}) [x_i^{(j)} = x_i],$$

$$\tilde{p}(x_i; \mathcal{S}) = \sum_{x^{(j)} \in s} \tilde{p}(x^{(j)}; \mathcal{S}) [x_i^{(j)} = x_i],$$

$$\tilde{p}(y; \mathcal{S}) = \sum_{x^{(j)} \in s} \tilde{p}(x^{(j)}; \mathcal{S}) Pr(y \mid x^{(j)}),$$

$$\tilde{p}(x^{(j)}; \mathcal{S}) = w_j,$$

and [•] is Iverson bracket, i.e., [x'=x]=1 if x' equals to x, 0 otherwise.

The population mutual information is an approximation to mutual information, the system can use Bayesian mutual information based on Bayesian entropy as an alternative.

Given the sample set $\mathcal{S}$, the greedy policy becomes $$\pi(x_{obs}) = \begin{cases} \operatorname*{argmax}_{y \in \mathcal{Y}} \tilde{p}(y; \mathcal{S}) & \text{if stop criteria meet,} \\ \operatorname*{argmax}_{i \in un} \tilde{I}(x_i, y; \mathcal{S}) & \text{otherwise.} \end{cases}$$

Next, the method of probing feature values is discussed. The feature value probing operation sequentially probes the feature with the largest mutual information with the label of the data. To estimate the mutual information, the system needs to sample factitious instances, which is discussed in next for sampling instances.

In general cases, it is difficult to directly model and learn a large number of combinations of $Pr(x_i, y \mid x_{obs})$. The system uses Monte Carlo methods to approximate $Pr(x_i, y \mid x_{obs})$ in Eq. (I). This section discusses the methods of sampling virtual instance set $\mathcal{S}$. Augmenting instances requires the underlying data model, which is usually domain specific.

In one embodiment, the system can explore a few commonly used data models. Based these data models, the system is able to pick a suitable sampling method to draw virtual instances.

With some data models, the system knows the distribution of one feature given the rest features, i.e. $Pr(x_i \mid x_{-i})$, where $-i$, represents the set of $\{j: 1 \leq j \leq d \text{ and } j \neq i\}$, for example, Bayesian networks, random fields, and Boltzmann machines.

If the underlying structure is known, the models can incorporate prior knowledge of the structure efficiently. Even without much prior knowledge, the system can use generalized linear models for each feature i against the rest features in many cases, for example, logistic regression $$Pr(x_i=0 \mid x_{-i}) = 1/(1+\exp(\alpha^T x_{-i}+b)).$$

Once the system has $Pr(x_i \mid x_{-i})$ for each $i \in un$, it is easy to obtain samples from the distribution of $Pr(x_{un} \mid x_{obs})$ by Gibbs sampling method. The Gibbs sampling is outlined in Algorithm 1.

| Algorithm 1 Gibbs Sampling from a conditional model |
|---|
| 1: randomly draw $x_{un} \in X_{un}$ |
| 2: for j = 1 to burn in number do |
| 3:   for i ∈ un do |
| 4:     update x by drawing $x_i \in X_i$ with a probability of $Pr(x_i|x_{-i})$ |
| 5:   end for |
| 6: end for |
| 7: return x |

Gibbs sampling method is easy to implement and has very few constraints. However, when the number of unknown features is large, it runs very slow. Therefore, the system may also consider two special models to obtain samples.

Next, the operation of the system using a nonparametric kernel density model is discussed. When the number of training data is large enough, the kernel density estimation is relatively good to capture the distribution of data. The kernel density model can be thought of as an extreme case of mixture model. The kernel density estimation is a nonparametric method to estimate the distribution of $Pr(x|\mathcal{D})$, $$Pr(x|\mathcal{D}) = \frac{1}{|\mathcal{D}|} \sum_{X \in \mathcal{D}} K(x, X),$$

where $K: \mathcal{X} \times \mathcal{X} \to \mathbb{R}$ is a kernel with $\int xK(x,\Psi)dx=1$, and $D=\{X^{(n)} \in \mathcal{X}\}$ is the set of training data. When the system can write the kernel function K as $$K(x, X) = \prod_i K_i(x_i, X_i),$$

the system can say the kernel is a product kernel. With a product kernel, the feature variables around each training data point can be thought as "locally independent". A widely used kernel, normalized radial basis function (RBF) kernel, is a product kernel for continuous features, for example, $$K_i(x_i, X_i) = \frac{1}{\sqrt{2\pi}\,\sigma_i} \exp\left(-\frac{(x_i - X_i)^2}{2\sigma_i^2}\right),$$

where $\sigma_i^2$ is known as the bandwidth of the kernel. For binary features, the system can use a kernel like $$K_i(x_i, \mathcal{X}_i) = \beta_i + (1-2\beta_i)[x_i = \mathcal{X}_i],$$

where a small positive $\beta_i$ mimics the bandwidth of the kernel.

The system can use a sampling method that takes advantage of a product kernel with little cost of learning. Here, the system assumes it has a product kernel. The system can efficiently infer marginal distribution $Pr(x_{un}|x_{obs})$, because $$Pr(x_{un}|x_{obs}) = Pr(x_{un}, x_{obs})/Pr(x_{obs}) \propto$$

$$\frac{1}{Pr(x_{obs})} \sum_{X \in \mathcal{D}} \mathcal{K}(x, X) \propto \sum_{X \in \mathcal{D}} K_{obs}(x_{obs}, X_{obs}) \prod_{i \in un} K_i(x_i, \mathcal{X}_i),$$

where $K_{obs}(x_{obs}, X_{obs}) \prod_{i \in un} K_i(x_i, \mathcal{X}_i)$. Then, the system can sample $Pr(x_{un}|x_{obs})$ as shown in Algorithm 2.

| Algorithm 2 Sampling from a kernel density model |
|---|
| 1: draw $X \in \mathcal{D}$ with a probability proportional to $K_{obs}(x_{obs}, X_{obs})$ |
| 2: for all i ∈ un do |
| 3:   draw $x_i \in X_i$ with a probability of $K_i(x_i, X_i)$ |
| 4: end for |
| 5: return x - $\{x_{obs}, x_{un}\}$ |

When the bandwidth of the kernel K goes to zero, the algorithm degrades to sample X where $X_{obs} = x_{obs}$. This degradation causes sampling from an empty set and over-fitting issues. In one embodiment, a heuristic variant of non-parametric sampling method can be used for texture synthesis, where only k nearest neighbors are used as samples without giving an explicit formula of the distribution of samples.

Next, exemplary test results are presented. The experiment uses documents data from Topic Detection and Tracking (TDT-2). The system picked a total of 4802 documents from seven topics with largest numbers of documents. The system selected the top 100 most informative words (features) from the documents. All features are converted into binary, i.e., "True" for the document containing the word, "False" otherwise. The data set is split into 70% for training and 30% for testing. First, the system uses multinomial logistic regression and decision tree to classify the documents, assuming all feature values are known. The results show the up bound that active feature probing could achieve.

| method | error rate |
|---|---|
| logistic regression | 5.0% |
| decision tree | 10.9% |

To simulate the technique support center scenario that callers have provide some information, in the experiment the system assumes that one random "True" feature is known. The system tries random probing for baseline. A random probing approach randomly select a few random features other than the given "True" feature(s), then augment the data with default values, "False", and classify with the logistic regression model.

| random probing | error rate |
|---|---|
| 0 probings | 75% |
| 1 probing | 74% |
| 10 probings | 60% |
| 20 probings | 51% |
| 30 probings | 44% |
| 40 probings | 38% |

The decision tree approach is ignoring known feature and using decision tree. For comparison, the system limits the number of features to be probed, i.e. the max depth of the tree. The results are as follows.

| decision tree | error rate |
|---|---|
| 5 probings | 18.2% |
| 8 probings | 12.2% |

The system tries two of the proposed approaches. One is generalized linear regression as the data model with Gibbs sampling described in Section 3.1, denoted by GLR. The other is the kernel density estimation with nonparametric sampling described in Section 3.2, denoted by KDE. The results are as follows.

| active feature probing | error rate |
|---|---|
| GLR, 5 probings | 16.1% |
| GLR, 8 probings | 11.5% |
| KDE, 5 probings | 8.3% |
| KDE, 8 probings | 5.4% |

As the results show, active feature probing results a higher accuracy than the random probing. The active feature probing methods outperform the static decision tree. The accuracy of the KDE method with 8 probings almost matches that of the logistic regression method on all features.

The above system can perform classification when the information is insufficient. The system studies the way of gathering further information by actively probing the information source. The active feature probing system dynamically selects the most informative feature to probe, based on the information gain. To estimate information gain, the system uses sampling techniques to avoid building a large number of classifiers. The system can deploy several sampling methods for difficult situations including a nonparametric sampling based on kernel density estimation. These methods outperform the random probing and static decision tree probing.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to classify information, comprising:
augmenting existing information with factitious data;
performing actively feature probing using the factitious data;
generate a model based on the active feature probing with factitious data;
classifying information using the model; and
determining a goal for a given $x_{obs}$ as:

$$\underset{i \in un}{\operatorname{argmin}} E_{Pr(x_i|x_{obs})} \mathcal{L}\left( Pr\left( \Psi | x_{obs+i} \right) \right).$$

where $\mathcal{L}(\mathcal{Q}(\Psi))$ is a loss function of a distribution $\mathcal{Q}(\Psi)$ on $\Psi$ and $Pr(\Psi | x_{obs+i}) = E_{Pr(x_{un} \setminus i | x_{obs+i})} Pr(\Psi|x)$, obs+$i$=obs $\cup$ {$i$}, and un\$i$={$j \in$un|$j \neq i$}.

2. The method of claim 1, comprising learning existing information.

3. The method of claim 2, comprising generating one or more feature vectors by clustering data from the existing information and the factitious data.

4. The method of claim 3, comprising generating a classification model using the one or more feature vectors.

5. The method of claim 1, learning information by clustering data from the existing information and the factitious data to generate one or more feature vectors and by generating a classification model from the one or more feature vectors.

6. The method of claim 1, wherein the classifying information is done at run-time.

7. The method of claim 6, comprising evaluating information in a new case to be classified.

8. The method of claim 7, wherein the evaluating information comprises determining entropy of a set of factitious cases generated from the new case.

9. The method of claim 6, comprising identifying the most similar past case as a solution.

10. The method of claim 1, comprising gathering additional information for the new case.

11. The method of claim 1, comprising determining a confidence on one or more outcomes after several probing.

12. The method of claim 11, comprising measuring an entropy for the one or more outcomes with $$H(y | x_{obs}) - \sum_{y \in \mathcal{Y}} Pr(y | x_{obs}) \log Pr(y | x_{obs}).$$

13. The method of claim 1, comprising determining a feature to probe.

14. The method of claim 1, comprising finding a feature to minimize an expected loss.

15. The method of claim 1, comprising obtaining the distribution of class label given all features, Pr(y|x), by a classification method.

16. The method of claim 15, comprising sampling a number of augmented instances using a Monte Carlo method.

17. The method of claim 16, comprising
approximating $Pr(x_i, \Psi | x_{obs})$ without explicitly summing over all possible un\i.

18. The method of claim 1, comprising drawing virtual instances.

19. The method of claim 18, comprising obtaining samples from a distribution using a Gibbs sampling method.

20. The method of claim 18, comprising obtaining samples from a distribution using a kernel density estimation.

21. A method to classify information, comprising:
augmenting existing information with factitious data;
performing actively feature probing using the factitious data;
generate a model based on the active feature probing with factitious data;
classifying information using the model; and
evaluating a probability by marginalizing a full probability $$Pr(x_i, y | x_{obs}) = \sum_{x_{un\backslash i} \in X_{un\backslash i}} Pr(x_i, y, x_{un\backslash i} | x_{obs})$$
$$= \sum_{x_{un\backslash i} \in X_{un\backslash i}} Pr(y | x_{obs}, x_{un\backslash i}, x_i) Pr(x_{un\backslash i}, x_i | x_{obs})$$
$$= \sum_{x_{un\backslash i} \in X_{un\backslash i}} Pr(y | x) Pr(x_{un} | x_{obs}).$$

22. A method to classify information, comprising:
augmenting existing information with factitious data;
performing actively feature probing using the factitious data;
generate a model based on the active feature probing with factitious data;
classifying information using the model;
dynamically building a decision split based on sampled data from $$Pr(x_{un} | x_{obs}) = Pr(x_{un}, x_{obs}) / Pr(x_{obs}) \propto$$
$$\frac{1}{Pr(x_{obs})} \sum_{X \in \mathcal{D}} K(x, z) \propto \sum_{X \in \mathcal{D}} K_{obs}(x_{obs}, z_{obs}) \sum_{i \in un} K_i(x_i, X_i).$$

* * * * *